Sept. 6, 1932.    J. A. McGREW    1,876,146
SHOCK ABSORBER
Filed Jan. 2, 1930
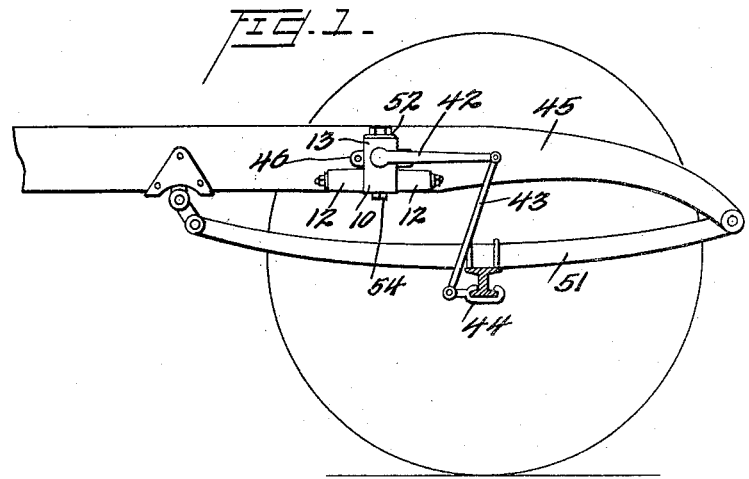
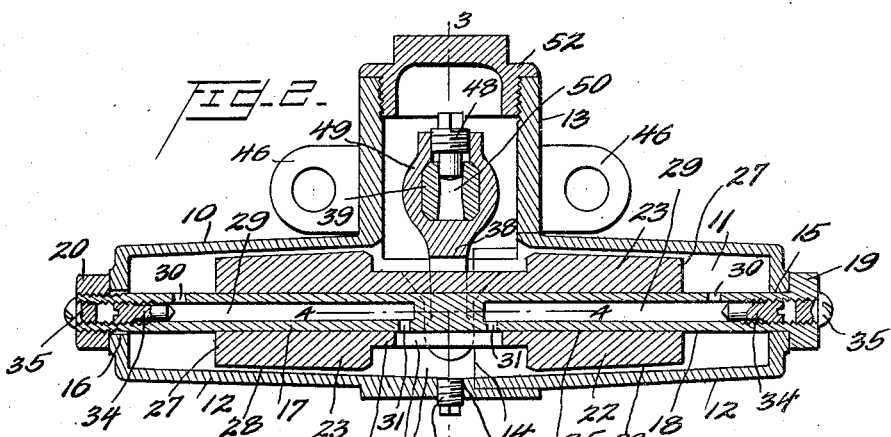
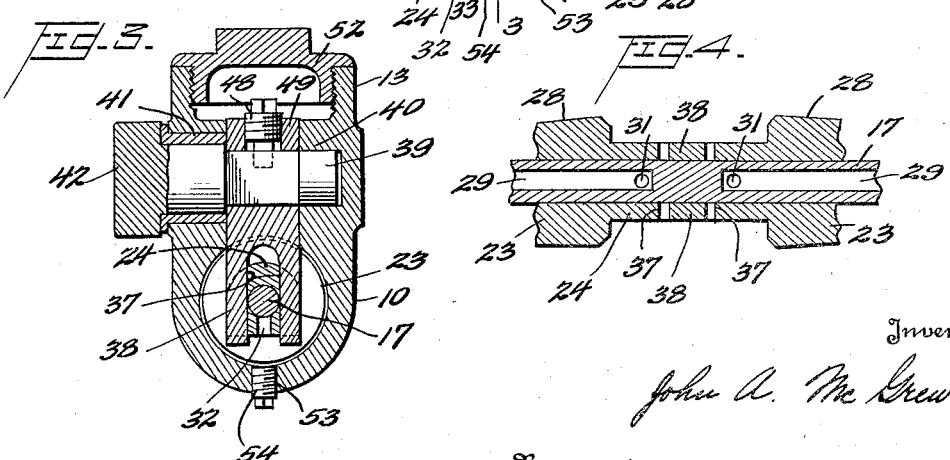
Inventor
John A. McGrew
By Watson, Coit, Morse & Grindle
Attorneys Patented Sept. 6, 1932

1,876,146

UNITED STATES PATENT OFFICE

JOHN A. McGREW, OF ALBANY, NEW YORK

SHOCK ABSORBER

Application filed January 2, 1930. Serial No. 418,054.

The present invention relates to shock absorbers, particularly to shock absorbers of the hydraulic type which are adapted to be employed in connection with motor vehicle springs to control the compression and rebound thereof.

This invention contemplates the provision of a "two-way" hydraulic shock absorber of the same general type as the one illustrated and described in my copending application, Serial Number 360,203, filed May 3, 1929, which is so designed as to retain all of the advantages to be derived from the use of the shock absorber forming the subject matter of that application, and in which novel means are provided for rigidly securing the sections of the shock absorber casing together, for by-passing the pressure fluid from one side of the plungers to the other, and for guiding and centering the plungers in their movement within the pressure fluid chamber.

In the accompanying drawing one embodiment of the invention is illustrated by way of example:

Figure 1 is a more or less diagrammatic view of the forward end of the chassis of a motor vehicle showing the manner of attachment of the shock absorber;

Figure 2 is a longitudinal axial section through the shock absorber;

Figure 3 is a section on line 3—3 of Fig. 2; and

Figure 4 is a section on line 4—4 of Fig. 2.

In the drawing, the numeral 10 designates the casing of the oil chamber 11 of the shock absorber and this casing will be seen to comprise two elongated tapered horizontally disposed sections 12 and a comparatively short vertically disposed portion 13 which extends upwardly from the upper surface of one of the sections 12 near the junction 14 between these two sections. The ends of each of these sections are apertured as at 15 and 16 to receive with a fluid tight fit the shank 17 of the elongated bolt or tension member 18. This tension member is provided with a head 19 at one end, and upon the other end thereof there is threaded a nut 20, the head 19 and the nut 20 serving, when the nut is tightened upon the member 18, to clamp the two sections 12 firmly together at the joint 14.

A movable piston 22 is housed within the elongated horizontal portion of the oil chamber 11 and this piston comprises two plunger members 23 and the reduced neck portion 24, these parts being either formed integral with each other or rigidly connected together. A cylindrical axial aperture 25 is formed in the piston 22 and passes from end to end thereof. This aperture 25 is adapted to slidingly receive the shank 17 of the member 18, and the piston in its entirety is guided in its movements longitudinally within the oil chamber by this member 18.

Each plunger member 23 has an annular pressure face 27 and a side wall 28 which tapers toward the pressure face, these plunger side walls being relatively long, preferably having lengths greater than the diameters of the pressure faces 27 and, at all events, longer than the radius of these pressure faces. The end portions of the elongated part of the oil chamber 11, enclosed by the casing sections 12, are formed as truncated cones and the inner walls of these casing sections taper in the same direction and to substantially the same degree as the outer side walls of the plungers. The diameter of the pressure face 27 of each plunger is substantially the same as the inside diameter of the end wall of the oil chamber, and the path of movement of the piston is of such length that for all positions of the piston, there is an annular passageway between the faces 28 and the tapered inner wall of the corresponding casing section 12.

Axial bores or ducts 29 are provided in the member 18 and extend from either end to within a short distance of the midpoint thereof. Openings 30 provide communications between these ducts 29 and the end portions of the oil chamber 11; and openings 31 in the member 18, together with the slot 32 cut in the lower central part of the neck portion 24 of the piston, connect the inner ends of the ducts with the central portion 33 of the oil chamber. The ducts 29 together with the openings 30 and 31 provide by-pass conduits whereby fluid may pass from one side of each of the plungers to the other. As either plunger moves toward the adjacent end portion of the oil chamber, it displaces the oil in front of it, and this oil flows to the rear of the plunger into the central portion 33 of the oil chamber, either by way of the annular passageway between the plunger side wall and the oil chamber side wall or by way of the by-pass conduit through the member 18. The effective areas of each by-pass conduit, 29, 30, 31, may be regulated by means of a valve comprising the adjustable screw 34, the outer end of which is accessible through the outer end of the bore 29, which is normally closed by the screw cap 35. The screws 34 may be readily turned by means of a suitable tool until their forward ends partially obstruct the openings or ports 30. The movement of fluid through each by-pass conduit may therefore be nicely regulated.

The neck portion 24 of the piston is cut away on each side as at 37, 37 to receive the downwardly extending extremities of a bifurcated arm 38 which is non-rotatably mounted on a shaft 39. The shaft 39 extends transversely of the shock absorber and is supported in bearings 40 and 41 formed in the opposite walls of the vertically disposed portion 13 of the casing. Formed integrally with the shaft 39 is the arm 42, to the outer end of which may be pivotally connected a link 43 which connects the arm 42 and the axle 44 of the vehicle. The casing of the shock absorber may be secured to the side frame member 45 of the vehicle by means of the ears or lugs 46. A screw bolt 48 extends through a threaded opening in the upper sleeve-like portion 49 of the arm 38 and into an opening 50 formed in the shaft 39, and serves to prevent relative rotation of the shaft and arm. The opening in the shaft extends diametrically through the same for the purpose of permitting the direction of the arm 42 to be reversed. Thus, when the screw bolt 48 is removed the arm 32 may be rotated through an angle of 180° in bearings 40 and 41 and the screw bolt 48 inserted in the opposite end of the opening 50. It is possible to use any shock absorber so constructed upon either side of the vehicle and at either end without change in its construction, as will be apparent.

The top of the vertically disposed cylindrical portion 13 is closed by a screw plug 52 which is easily removable for the purpose of introducing fluid or manipulating the screw bolt 48. An aperture 53 is provided for drainage purposes, being normally closed by a plug 54.

In the operation of the shock absorber, each movement of the piston away from its mid position is opposed by the fluid in advance of one of the plungers. When the movement of the plunger is relatively small the fluid escapes through the annular passageway around the plunger and also through the by-pass through the plunger. When the recoil or compression of the vehicle spring 51 is great, the plunger moves in this way until one of the by-pass ports or openings 31 is covered or obstructed by the neck portion 24 of the piston beyond the end of the slot 32, and the by-pass conduit is cut off. Resistance to further movement of the plunger is greatly increased at this point since the only escape for the oil in front of the plunger is through the annular elongated passageway around the plunger. This passageway decreases in cross-section as the plunger advances and so the resistance to further movement of the plunger builds up with great rapidity after the ports 31 are closed. A point is very quickly reached where the resistance to the flow of oil or other pressure fluid around the plunger is so great that the plunger comes to a standstill.

By means of the adjustable flow control screws the effective areas of the two by-passes may be made equal or unequal. If the areas are equal the fluid resistances to plunger movements will be the same in both directions. If the areas are unequal the piston will move in one direction more freely than in the other. The ease with which the adjustability may be effected renders it possible for the ultimate user of the shock absorber to adjust it to his own satisfaction.

The respective points at which the by-passes will be cut off in the movement of the piston in each direction may be predetermined by cutting the slot 32 the desired length or by varying the length of the bores 29 and locations of the ports 31. It will be readily understood that the bolt-like members 18, which serve the three-fold purpose of holding the sections of the shock absorber casing together, guiding and centering the piston in its movements, and providing the fluid by-passes, may be made with variously graduated lengths of by-pass conduit and the proper one may be selected for use in the shock absorber in a given case.

It may also be pointed out that the present shock absorber possesses an automatic adjustment feature, the operation of which will be apparent from the following description:—

The shock absorber is applied to the vehicle and adjusted so that under full loading of the vehicle the positions of the parts are as shown in the drawing. The screws 34 are then adjusted to give the proper amount of resistance to shocks experienced under this loading. Then with less than full load, that is, with less than initial spring compression, the arm 42 is lowered, thus moving the bifurcated arm 38 and the piston in the direction of the recoil end of the casing, thus making the initial position of the parts under any load less than full load such that the resistances are decreased as to spring compression and increased as to spring recoil under the impact of shocks sustained. This adjustment is of course of great value in the case of light cars or vehicles, that is, those in which the live load is relatively large compared with the dead load on the springs.

The shock absorber is so constructed that it does not leak and the fluid remains in the chamber indefinitely. A sufficient quantity of fluid is placed in the fluid chamber to entirely submerge the two plunger portions of the piston but the fluid level lies below the bearings 40 and 41 so that there can be no leakage at these points.

It will be realized by those skilled in the art that the design and arrangement of the component elements of the invention may be considerably modified without departing from the spirit and scope of the invention, as set forth in the claims appended hereto.

Having thus described the invention what is claimed as new and desired to be secured by Letters Patent is:

1. In a shock absorber, in combination, a casing enclosing a fluid chamber, a plunger adapted to reciprocate within said chamber but remain at all times out of contact with the walls of said chamber, said casing and plunger being, respectively, adapted to be connected to relatively movable elements, and a member rigid with said casing and extending from end to end of said chamber, said member being slidably received within a longitudinal opening through said plunger, whereby said plunger may be guided in its movements within said chamber.

2. In a shock absorber, in combination, a casing enclosing a fluid chamber, a plunger adapted to reciprocate within said chamber but remain at all times out of contact with the walls of said chamber, said chamber and plunger being, respectively, adapted to be connected to relatively movable elements, and a member rigid with said casing and extending from end to end of said chamber, said member being slidably received within a longitudinal opening through said plunger, whereby said plunger may be guided in its movements within said chamber, said member also having conduits therein opening into said chamber on either side of said plunger, whereby fluid may be by-passed from one side of said plunger to the other.

3. In a shock absorber, in combination, a two part casing forming a fluid chamber, a plunger adapted to reciprocate within said chamber but remain at all times out of contact with the walls of said chamber, said casing and plunger being, respectively, adapted to be connected to relatively moving elements, a tension member rigid with said casing, extending centrally from end to end of said chamber and adapted to secure the two parts of said casing firmly together, said member being slidably received within a longitudinal opening through the plunger, whereby the plunger may be guided in its movement within said chamber.

4. In a shock absorber, in combination, a two part casing forming a fluid chamber, a plunger adapted to reciprocate within said chamber but remain at all times out of contact with the walls of said chamber, said casing and plunger being, respectively, adapted to be connected to relatively moving elements, a tension member rigid with said casing, extending centrally from end to end of said chamber and adapted to secure the two parts of said casing firmly together, said member being slidably received within a longitudinal opening through the plunger, whereby the plunger may be guided in its movement within said chamber, said member also being provided with conduits opening into said chamber on either side of said plunger, whereby fluid may be by-passed from one side of said plunger to the other.

5. In a shock absorber, in combination, a two part casing forming a fluid chamber, a plunger adapted to reciprocate within said chamber but remain at all times out of contact with the walls of said chamber, said casing and plunger being, respectively, adapted to be connected to relatively moving elements, a tension member rigid with said casing, extending centrally from end to end of said chamber and adapted to secure the two parts of said casing firmly together, said member also being provided with conduits opening into said chamber on either side of said plunger, whereby fluid may be by-passed from one side of said plunger to the other.

6. The combination set forth in claim 4 in which means are provided for regulating the flow of fluid through said by-pass conduits.

7. In a shock absorber, in combination, a casing enclosing a fluid chamber, a plunger adapted to reciprocate in said chamber but remain at all times out of contact with the walls of said chamber, an elongated member rigid with said casing and extending from end to end of said chamber, said plunger being provided with a longitudinal opening therethrough to slidably receive said member, said member being provided with conduits opening into said chamber on both sides of said plunger, whereby fluid may be by-passed from one side of said plunger to the other.

8. The combination as set forth in claim 7 in which manually adjustable means are provided for regulating the effective area of said by-pass conduits.

9. The combination as set forth in claim 7 in which a valve is provided for regulating the effective area of said by-pass conduits, the stem of said valve being accessible from without the chamber for the purpose of adjustment.

10. In a shock absorber, in combination a casing enclosing a fluid chamber, an elongated plunger therein, said chamber and plunger being, respectively, adapted to be connected to relatively movable elements, the side walls of the chamber and plunger being tapered to substantially the same degree and in the same direction, an elongated member rigid with said casing and extending axially from end to end of said chamber, which member is slidably received within an opening formed axially through said plunger, so that said plunger is constrained to move axially of the chamber upon the occurrence of relative movement between said movable elements, there being for all positions of the plunger an elongated fluid passageway between the side wall of the chamber and the side wall of the plunger, which has, in cross-section, the shape of an annulus.

11. A shock absorber, comprising a casing having an elongated fluid chamber therein having its greatest cross-sectional area at its intermediate point and tapering toward both ends, a piston movable in said chamber, said casing and said piston being, respectively, adapted to be connected to relatively movable members, said piston also tapering toward both ends and being of such size that a passageway is formed between the piston and the chamber wall, the effective area of which will vary according to the position of the piston, an elongated member rigid with said casing, extending axially from end to end of said chamber, and being slidably received within an opening formed axially through said plunger, said member being provided with conduits opening into said chamber on either side of said plunger whereby fluid may be by-passed from one side of said plunger to the other.

12. In a shock absorber, in combination, an elongated casing enclosing a fluid chamber, a piston movable therein and comprising a pair of plungers connected by a reduced central portion, an elongated member rigid with said casing, extending from end to end of said chamber and adapted to be slidably received within an axial opening through the piston, said member being provided with a pair of conduits the outer ends of which open into the outer portions of the fluid chamber and the inner ends of which lie within said reduced connecting portion of the piston, a part of said connecting portion being cut away to provide communication between the inner ends of the conduits and the central portion of said fluid chamber.

13. The combination according to claim 12 in which there is provided, for all positions of the plunger, elongated fluid passageways between the side wall of the chamber and the side walls of the plunger, which have, in cross-section, the shape of an annulus.

14. A shock absorber, comprising, in combination, a casing having an elongated fluid chamber therein having its greatest cross-sectional area at its intermediate point and tapering toward both ends, a piston movable in said chamber, said casing and said piston being, respectively, adapted to be connected to relatively movable members, said piston comprising a pair of plungers connected by a reduced central portion, said plungers being disposed to reciprocate within the tapered end portions of the chamber, being tapered to substantially the same degree and in the same direction as the respective chamber portions, and being of such size that annular passageways are formed between the plungers and the chamber wall, the effective area of which will vary according to the position of the piston, an elongated member rigid with said casing, extending from end to end of said chamber, and adapted to be slidably received within an axial opening through the piston, said member being provided with a pair of conduits the outer ends of which open into the end portions of the fluid chamber and the inner ends of which lie within the reduced connecting portion of the piston, a part of said connecting portion being cut away to provide communication between the inner ends of the conduits and the intermediate portion of the fluid chamber, whereby further means for by-passing the fluid from the end portions to the intermediate portion of the chamber is provided, and means for regulating the rate of flow of fluid through said by-pass conduits.

15. The combination according to claim 14 in which the piston is adapted to cover and obstruct the inner and outer end openings of the conduits in said elongated member, alternately, at certain points in its movement relatively to said casing and said member.

16. In a shock absorber, in combination, a casing comprising a plurality of separable parts and enclosing a fluid chamber, a plunger adapted to reciprocate within said chamber but remain at all times out of contact with the walls of said chamber, said casing being provided with an opening through each of its ends, an elongated bolt the shank of which is adapted to pass through said openings and extend axially from end to end of said chamber, a threaded portion of said shank adapted to project from one end of said chamber, means for adjusting the tension of said bolt comprising a nut threaded upon said projecting end, and passageways provided within said bolt whereby fluid may be by-passed from one side of said plunger to the other, said plunger being provided with an axial opening adapted to receive said bolt whereby said plunger may be guided in its movement within said chamber.

17. In a shock absorber, in combination, a casing enclosing a fluid chamber, a plunger adapted to move therein, said casing being provided with an opening through each of its ends, an elongated bolt the shank of which is adapted to pass through said openings and extend from end to end of said chamber, means for adjusting the tension of said bolt, said bolt being provided with conduits therein whereby the fluid may be by-passed from one side of said plunger to the other, and valves adapted to control the flow through said conduits, the stems of said valves being threaded within openings in said bolt.

18. The combination according to claim 17 in which removable plugs are provided for the purpose of closing the outer ends of the valve stem receiving openings.

In testimony whereof I hereunto affix my signature.

JOHN A. McGREW.